United States Patent

[11] 3,543,907

[72] Inventors Stuart D. Pool;
Richard R. Steingas, Naperville, Illinois
[21] Appl. No. 785,433
[22] Filed Nov. 18, 1968
Division of Ser. No. 444,173, Mar. 31, 1965, now Pat. No. 3,430,425,
[45] Patented Dec. 1, 1970
[73] Assignee International Harvester Company, a corporation of Delaware

[54] EXPANDABLE CELL STATIC CONVEYOR
9 Claims, 20 Drawing Figs.
[52] U.S. Cl. .................................................. 198/1
[51] Int. Cl. .................................................. B65g
[50] Field of Search .......................................... 56/328, 329; 198/1

[56] References Cited
UNITED STATES PATENTS
2,436,648  2/1948  Isom ........................... 56/329
3,327,832  6/1967  Kyle ............................ 198/1
FOREIGN PATENTS
1,032,637  6/1966  Great Britain ................ 198/1

Primary Examiner—Russell R. Kinsey
Attorney—Noel G. Artman

ABSTRACT: A conveyor in the form of a pad for moving articles deposited thereon, having a series of inflatable and deflatable sinuses and a valved conduit and pump for sequentially inflating and deflating selected sinuses for undulating the surface of the pad for advancing the fruit to a collection and delivery area.

INVENTORS
STUART D. POOL
RICHARD R. STEINGAS

John J. Kowalik
ATTY.

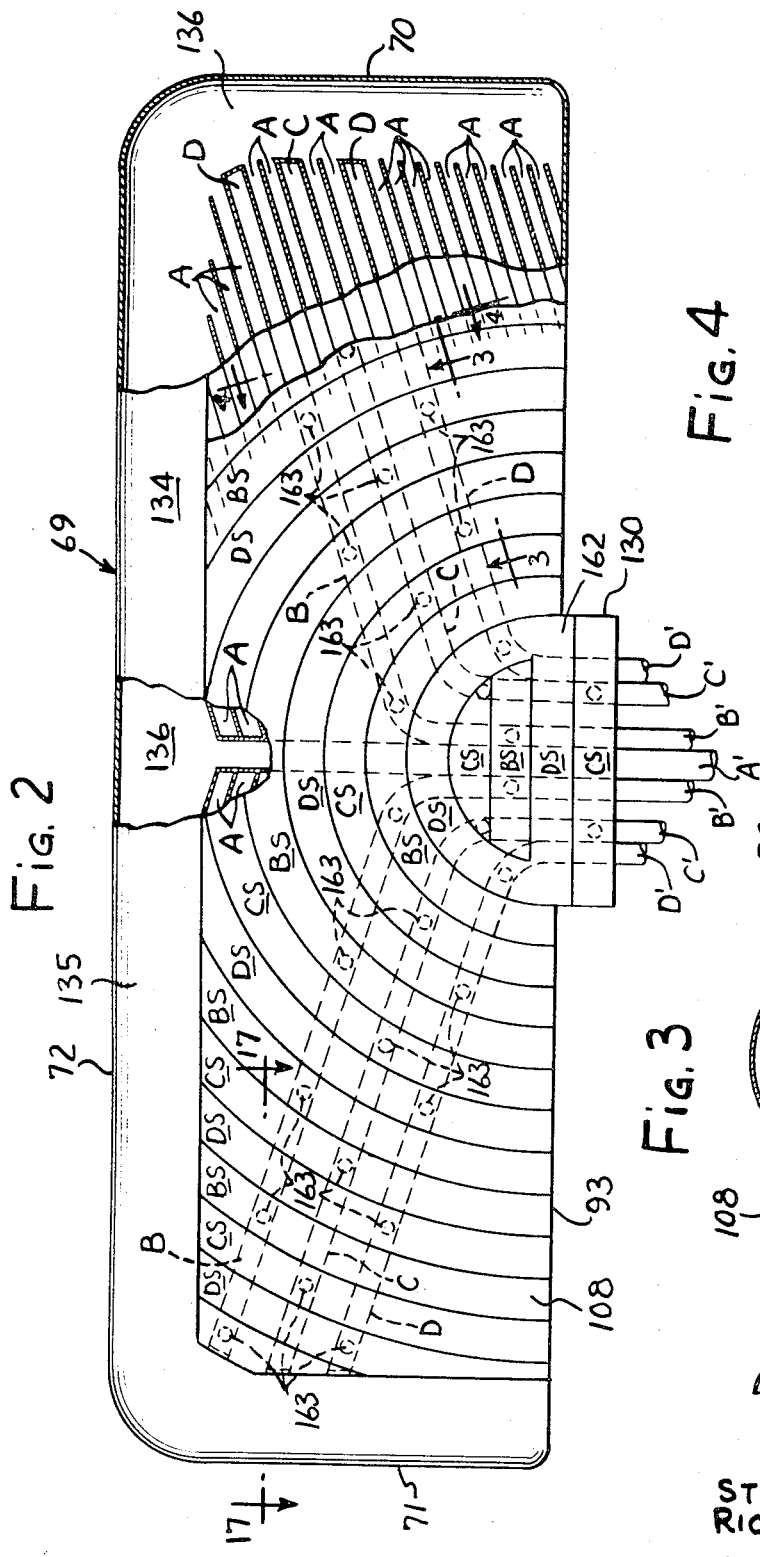
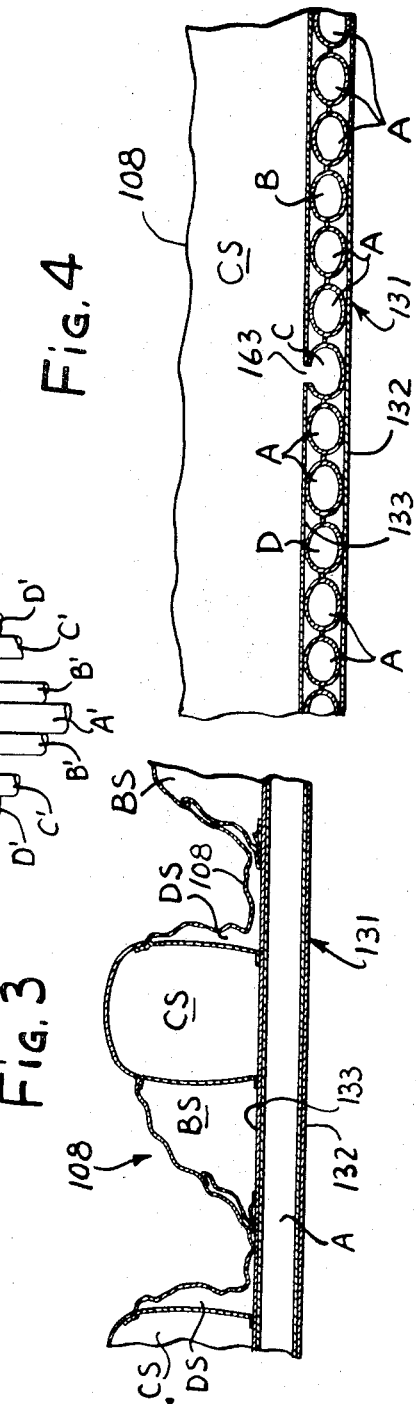

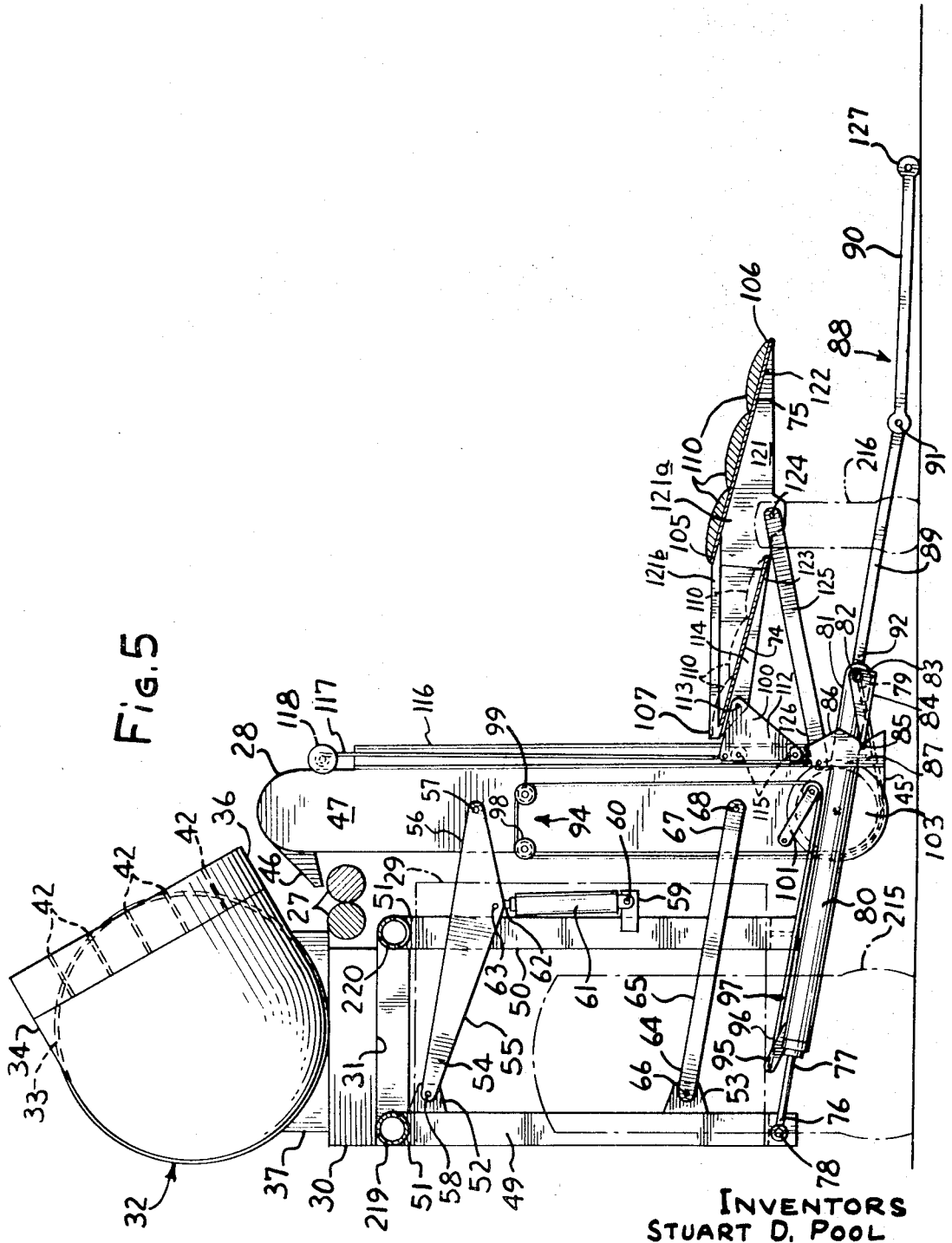

INVENTORS
STUART D. POOL
RICHARD R. STEINGAS

ATTY.

INVENTORS
STUART D. POOL
RICHARD R. STEINGAS

John J. Kowalik
ATTY.

INVENTOR
STUART D. POOL
RICHARD R. STEINGAS

ATTY.

3,543,907

EXPANDABLE CELL STATIC CONVEYOR

This application is a division of U.S. Pat. application Ser. No. 444,173 filed March 31, 1965 now U.S. Pat. No. 3,430,425.

The instant invention relates to devices for harvesting fruit and the like. Particularly the invention relates to a fruit harvesting device comprising a combination fruit catching bed and static conveyor and therewith associated conveying means.

For many tree crops such as fruit, harvesting conventionally comprises manually picking from trees rather than shaking of such fruit tree and permitting it to fall, because of the hazard of bruising attendant in the latter. Conventionally, relatively inexpensive labor has been employed domestically for hand picking, mostly from pools of foreign laborers, the availability of whom depends upon legislation of the Congress of the United States. To obviate the requirement of relying upon labor from that tenuous a source, it is desirable to provide means for mechanically harvesting fruits and the like which hitherto were not adapted efficiently and economically to be harvested by previously available or known mechanical means.

For a suitable mechanical device of the class described, a number of characteristics or features are imperative. Among these is that such device be mobile within an orchard. Another is that means be provided effectively to dislodge fruit and the like from trees by mechanical force. Furthermore, such devices must be adapted for catching dislodged fruit with virtually no bruising. Additionally, means must be provided for conveying such caught fruit to a central collection point sans manual assistance.

It is an object of the instant invention to provide a unique harvesting device adapted for harvesting of fruits and the like and having the aforestated characteristics and features.

It is additionally an object of the instant invention to provide in a device for harvesting fruits and the like, fruit shaker means for mechanically causing fruits to fall from trees and fruit catching means upon which such fruits will fall to preclude bruising with means providing a fruit shaking and catcher cushioning force.

Another object of the instant invention is the provision in a fruit harvesting device of a combination fruit catcher and static conveyor having an air undulated surface.

A yet further object of the instant invention is the provision of a mobile fruit harvesting device having a padded or resilient fruit catching apron or bed which is carried on a novel framework adapted to extend the catching apron or bed into catching position about the base of a tree to be harvested, and to collapse the fruit catching apron or bed and to elevate the same to permit mobility of the harvesting device.

A still further object of the instant invention is the provision of a fruit harvester and the like having a pad or fruit catcher adapted to catch falling fruit and means for undulating the pad or fruit catcher by alternately inflating and deflating sections thereof to convey the fallen fruit to a collection center, a harvester carried framework which carries the pad and is adapted to fold and elevate the same to facilitate mobility within an orchard, and guide means for directing fruit upon said pad or fruit catcher.

The foregoing and other objects, features and advantages of the present invention will become more apparent upon consideration of the following description and appended claims when considered in conjunction with the accompanying drawings wherein the same reference character or numeral refers to like or corresponding parts throughout the several views.

On the drawings:

FIG. 2 is a top plan view of a fruit catcher or pad embodying the invention and in extended position with parts being broken away and parts shown in dotted lines for the purpose of illustration.

FIG. 3 is a vertical sectional view taken substantially on the line 3–3 of FIG. 2 and looking in the direction of the arrows.

FIG. 4 is a vertical sectional view taken substantially on the line 4–4 of FIG. 2 and looking in the direction of the arrows.

FIG. 5 is a vertical sectional view taken on a plane transversely of the harvester tractor to show in elevation the fruit catcher or pad supporting framework in extended position with the fruit catcher or pad removed.

Figure 1:
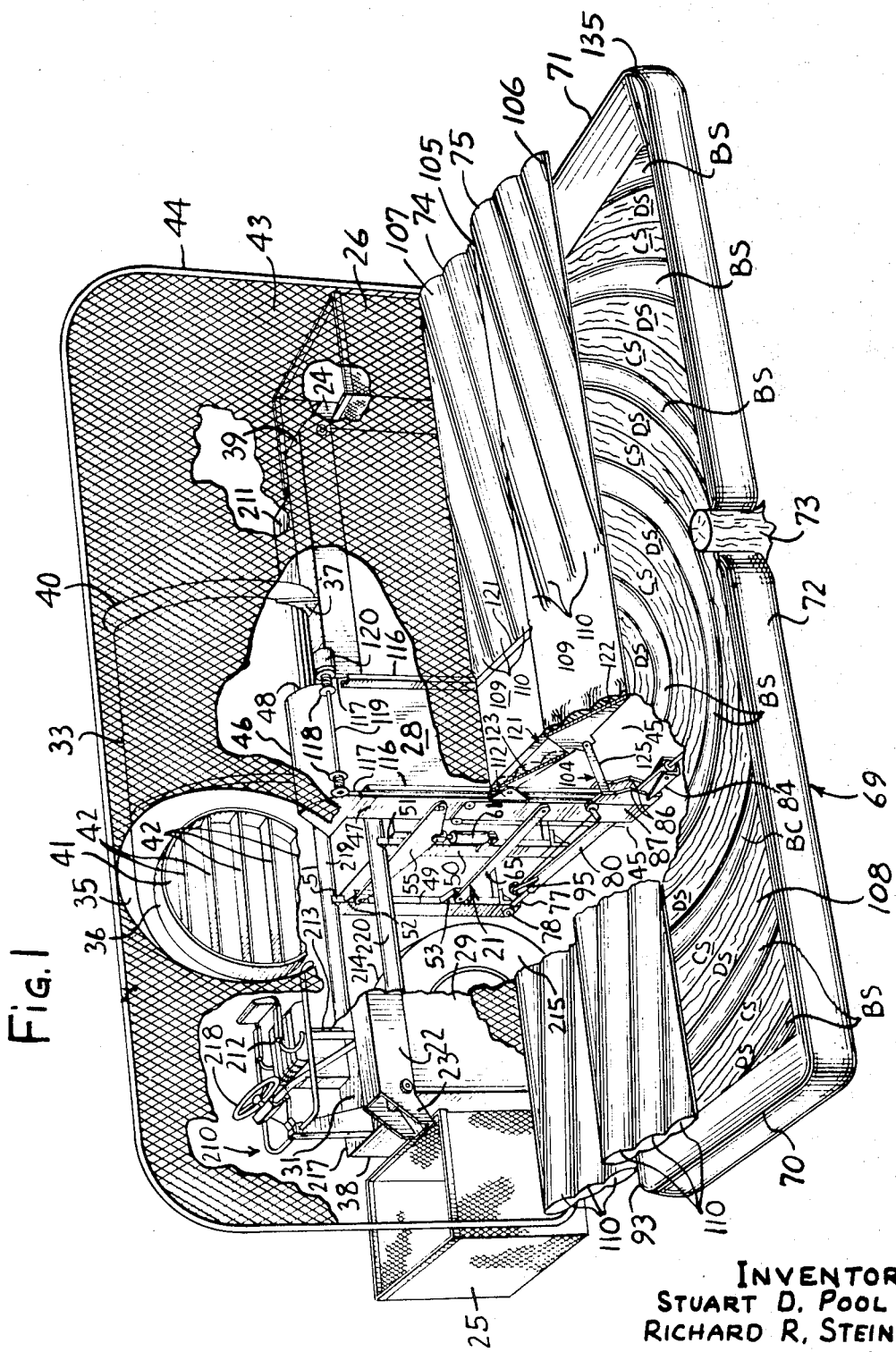
FIG. 1 is a perspective view of a fruit harvester embodying one form of the instant invention, parts being broken away for the purpose of illustration.

Referring now more particularly to FIG. 1 of the drawings, there is seen a fruit harvester embodying a tractor generally designated as 210. The tractor has an elongated body 211 supported on one side by a pair of high profile traction wheels 214 and 215 adapted for disposition outwardly or distally of a tree 73 to be harvested. Within the forward end 217 of the body 211, a power plant (not shown) is mounted and is operable from a seat 212 mounted on a stand 213. The stand 213 is secured to the top 31 of the body forward end portion 217 to place seat 212 adjacent to the tractor steering mechanism 212.

The body 211 comprises a pair of parallel, laterally spaced, elongated rails 219 and 220 which support an elevator lift mechanism generally designated as 21 in FIG. 1 and which will be described presently with particularity.

Figure 6:
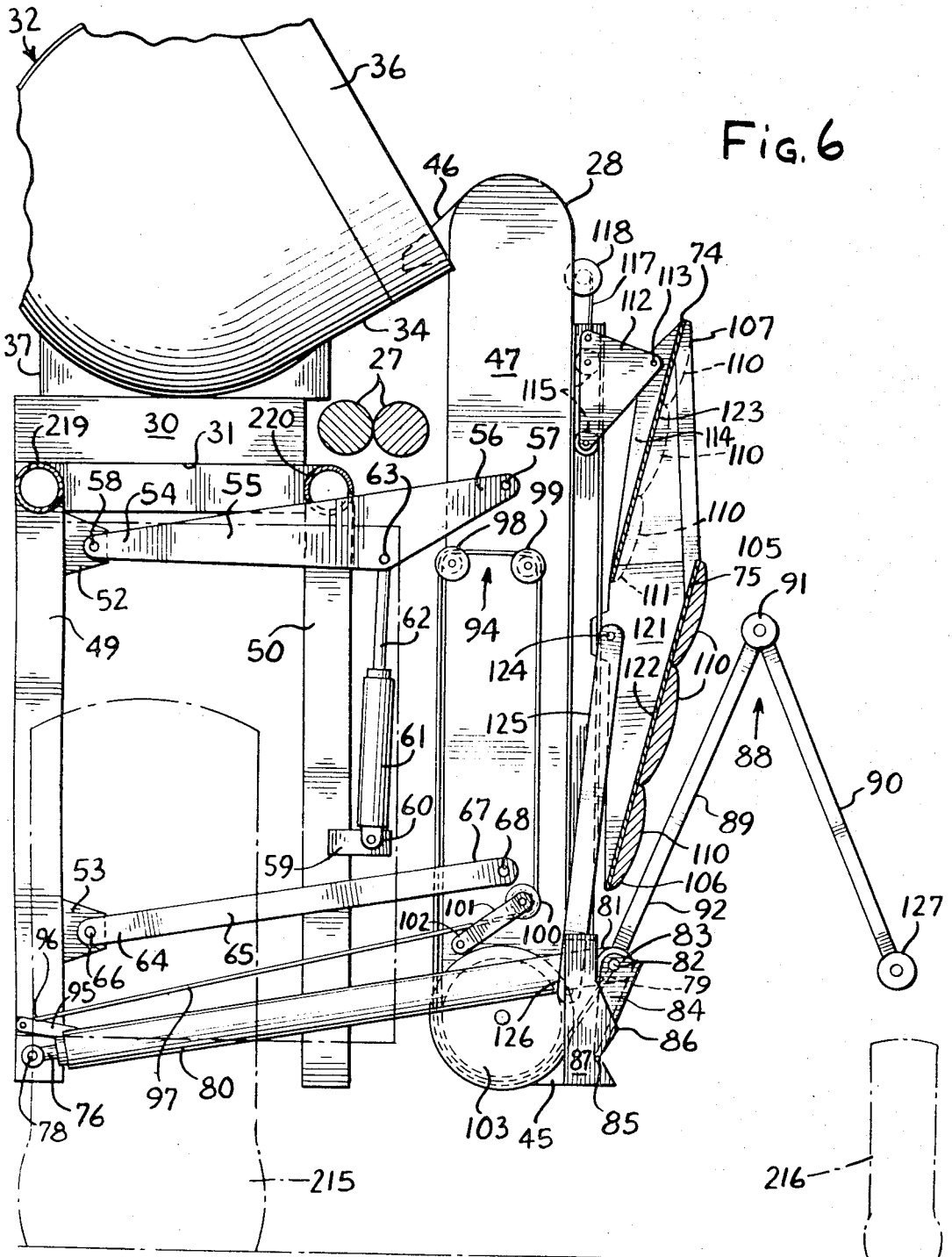
FIG. 6 is an enlarged view similar to FIG. 5 but showing the fruit catcher or pad supporting framework collapsed.

An elongated channellike member defining a conveyor housing 22 is carried on the body 211 adjacent its top 31 along the inside or treeward sidewall wall 29 thereof. Conveyor housing 22 extends the length of said body 211, terminating in a pair of oppositely and downwardly extending integral chutes 23 and 24 which are disposed in delivery alinement with a pair of bulk handling containers 25 and 26, respectively, which are mounted adjacent opposite ends of the body 211, as illustrated in FIG. 1. Two pairs of roller conveyors 27, only one pair of which is shown in the drawings in FIGS. 5 and 6, are operably mounted in said conveyor housing respectively extending toward opposite chutes 23 and 24, whereby each pair of roller conveyors 27 conveys fruit delivered into the conveyor housing 22 by an elevator (not seen) disposed in an elevator housing 28 to a respective of the bulk containers 25 and 26. As illustrated in FIGS. 1, 5 and 6, the elevator housing 28 is carried by the elevator lift 21 adjacent the inside wall 29 of the body 211.

A pair of stands 37 spaced longitudinally of body 211 and supporting the air intake housing 33 of a hurricane blast-type fan generally designated 32 are mounted on a shock-absorbing base 30 which is supported by the top 31 of the housing 211 medially of its front and rear ends 38 and 39, respectively. The air intake housing 33 of said fan 32 extends longitudinally of the tractor body 211, and its intake opening 40 is directed toward the tractor rear end 39. The blower housing end portion 34 of said fan 32 is disposed substantially perpendicular to the intake housing section 33, and is rockable in a vertical plane, whereby the blower opening 41 in the blower housing outlet end portion 36 may be directed over a vertical range which will insure a blasting force at all vertical positions of the tree to be harvested, whereby fruits from all vertical elevation will be blown from a tree to be harvested. To additionally facilitate precision directing of blasts, conventional tiltable louvres 42 operable by any suitable means may be provided in the opening 41.

The opening 41 is alineable with a hole 35 in an elongated screen 43 which extends longitudinally of the tractor body 211, preferably beyond its opposite ends and the containers 25 and 26 mounted thereon, as illustrated in FIG. 1. The screen 43 is disposed adjacent the outer surface of the elevator housing 28 which is disposed between said screen 43 and the tractor side wall 29. The screen 43 functions as a stop for fruit blown from a harvested tree by a companion unit which operates in conjunction with the illustrated device. That is to say, the harvester 210 is adapted to be employed with a like harvester operating as a harvesting unit, each being disposed at an opposite side of tree 73 to be harvested, whereby fruit on a tree being harvested is blown simultaneously from opposite sides of said tree. The screen may be carried in a frame 44 which is suitably connected to portions of the framework (not shown) of the tractor 210 in any suitable or convenient manner.

The elevator housing 28 extends vertically with its lower or receiving end 45 adapted for disposition adjacent a fruit catcher, catching apron or pad 69 the character of which will be presently described. The upper or delivery end portion of said elevator housing 28 is defined by a hood 46 which is disposed above and downwardly directed in delivery alinement with the conveyor rollers 27, as illustrated in FIGS. 1, 5 and 6. The elevator housing 28 is defined by a pair of sidewalls 47 and 48 each of which may have connected thereto one of a pair of substantially identical elevator lifts generally designated 21, only one of which is shown in the drawings and being connected to the sidewall 47.

The elevator lift 21 which is seen in the drawings comprises a pair of depending rigid arms or mounting members 49 and 50 the upper end 51 of each of which is rigidly secured to a respective of the rails 219 and 220 from which said supports 49 and 50 depend in parallel relationship spaced transversely of the body 211, the support 49 being disposed toward the outside of said body, the support 50 being disposed to the inside or treeward side 29 of said body. The support 49 has rigidly secured thereto or integral therewith a pair of vertically spaced ears, brackets or lugs 52 and 53 which extend treewardly, as illustrated in the drawings in FIGS. 1, 5 and 6. Ear, bracket or lug 52 is mounted adjacent rail 219, whereas ear, bracket or lug 53 is mounted on the lower end portion of support 49.

The outer end portion 54 of a transversely extending arm 55 is pivoted to the ear, bracket or lug 52 by means of a pin 58. The opposite or treeward end portion 56 of said arm 55 is pivotally connected by means such as a pin 57 to a medial portion of said elevator casing sidewall 47. By reason of the foregoing, the arm 55 crosses and extends beyond the support 50 which, in a position disposed below said arm 55, carries a bracket or boss 59 on which there is anchored the mounting lug 60 of a vertically extending hydraulic cylinder 61 the piston or extensible rod 62 of which is pivotally connected to a medial portion of the arm 55 by means including a pivot pin 63, as illustrated in FIGS. 5 and 6.

The outer end portion 64 of an elongated arm 65 of lifts 21 is pivotally connected as at 66 to the ear, bracket or lug 53. The opposite or treeward end portion 67 of said arm 65 is pivotally connected to the elevator housing sidewall 47 by suitable means such as, for example, pin 68. As illustrated in the drawings, the arms 55 and 65 are in superposed relationship with the arm 65 being connected to a lower end portion of said elevator housing 28, whereby upon extension of the rod or piston 62 from the position of FIG. 5 to the position of FIG. 6, arms 55 and 65 are rocked upwardly about their respective centers of rotation provided by pins 58 and 66.

As illustrated in FIG. 1, the invention comprehends a fruit catch or catching apron or pad heretofore identified and generally designated by the numeral 69. The pad may have substantially parallel front and rear walls or ends 70 and 71, respectively, and an inner or treeward side 72 preferably of elastomer fabrication to encircle half the periphery of a tree 73 to be harvested when said pad 69 is in operative position, whereby a pair of such pads placed on the ground and extended against a tree 73 from opposite sides thereof will completely encircle a tree so that all fruit shaken therefrom will be caught by such pair of pads. The fruit catching apparatus also includes a pair of tiltable cushioned or padded shelves 74 and 75 which extend longitudinally of the tractor 210 and, when in operative or fruit catching position, being disposed at an angle to the ground in overlapping position. The precise details of construction of pad 69, as well as those of the cushioned or padded shelves 74 and 75, will become apparent presently.

The outer end portion 76 of an elongated hydraulic cylinder rod or piston 77 is pivotally secured, as at 78, to the lower end portion of the support 49. The hydraulic cylinder 80 associated with said piston 77 is elongated and extends transversely of the body 211 beneath the screen 43. The outer end portion 81 of said hydraulic cylinder 80 is pivotally secured, as at 82, between the spaced ears 83 of a camlike bracket 84. The tractorward end portion of the camlike bracket 84 is carried on a pin 85 which is rockably seated in a pair of alined recesses in the treeward side of opposite spaced apart ears 86 of a bracket 87. Bracket 87 is rigidly secured adjacent the treeward wall of the elevator housing 28, and from between the ears 86 of said bracket 87 the cylinder end portion 81 is projected between the ears 83 of bracket 84, as illustrated in FIGS. 1, 5 and 6 of the drawings. It is appreciated that a cylinder traveling the cylinder 80, and associated parts, may be disposed adjacent the elevator housing sidewall 40; however, the same is not shown in the drawings. The cylinder 80 and its associated parts serve to control a collapsible support, generally designated by the numeral 88, for the pad 69. Only one pad support 88 is shown and will be described.

The pad support 88 comprises an elongated arm having a tractorward section 89 coextensive with a treeward section 90, said sections 89 and 90 being pivotally connected together at an elbow or joint 91. The tractorward portion 92 of arm 89 is rigidly secured to the treeward portion of bracket 84. Therefore, when the piston 77 is extended, the cylinder 80 will be moved away from the fixed support 49 extending the bracket 84 toward tree 73, thereby carrying the pad support 88 to the position illustrated in FIG. 5. In such position, the pad 69 which is supported on the top of the pad support 88 will assume the position shown in FIG. 1. Upon retraction of the piston 77, the cylinder 80 will move toward the support 49 causing the bracket 84 to rock upwardly about 90° to the position illustrated in FIG. 6. The arm section 89 which is rigidly secured to the bracket 84 will also be rocked upwardly correspondingly while the arm section 90 will rock pendulously under its weight from elbow or joint 91 so that the support 88 assumes the position shown in FIG. 6 which is the collapsed, folded or traveling position.

In explanation, the extended position of the support structure and pad explanation, obtained from its retracted or collapsed position as shown in FIG. 6, wherein the elevator is in raised position, by first lowering the elevator which is accomplished by retracting ram 61, 62 which swings the arms 55, 65 downwardly to the position shown in FIG. 5. Thereafter the ram 80, 77 is extended causing arms 89, 90 to unfold to position shown in FIG. 5. Then cable linkage 118 is unwound by actuating the hydraulic motor 120 which lowers trolley 112 as hereinafter explained.

As illustrated in FIG. 1, the tractorward side 93 of pad 69 when in operative or fruit-catching position is treeward of the screen 43 with the area between the screen and the side 93 being covered by the cushioned shelves 74 and 75. A greater portion of the pad 69 is positioned on the arm section 90 than on the arm section 89; therefore, when the pad support 88 is collapsed, and because the greater weight of the pad 69 is on the arm section 90, the pad 69 will have a tendency to slide off of its support to the right with respect to FIG. 6. To preclude that occurrence, pad holding means, generally designated as 94 in FIGS. 5 and 6, are provided and comprise a pair of substantially identical combinations each of which is disposed on a respective side of the elevator housing 28 and only one of which is shown in the drawings.

The pad holding means 94 which is shown has a lug or boss 95 which is rigidly secured to the tractorward side of cylinder 80 and accordingly will move inwardly or outwardly therewith. One end portion 96 of a pad holding cable 97 is rigidly secured to said boss or lug 95, and the opposite or treeward end portion 79, shown only in dotted lines, is rigidly connected to the tractor side 93 of the pad support 88. Thereby, upon folding of the pad support 88, not only will the pad 69 be held by the cable 97 but it will also be partially pulled toward the tractor 210 as the lug or boss 95 moves from the position of FIG. 5 to the position of FIG. 6. The cable 97 has been omitted from FIG. 1 to minimize crowding in that drawing.

A cable guide comprises a pair of pulley wheels 98 and 99 which are mounted medially of the elevator housing sidewall 47. The pulley wheels 98 and 99 are substantially horizontally alined in spaced apart relationship transversely of the sidewall 47. One of the pulley wheels 99 is operably alined with a pulley wheel 100 which is rockable in a vertical plane and rotatably carried in one end portion of a rockable arm 101 the opposite end portion 102 of which is pivotally connected to the housing sidewall 47 in a position spaced below the pulley wheels 98 and 99. An enlarged pulley wheel 103 is mounted on the lower end portion of the elevator housing side member 47. The cable 97 extends from the boss or lug 95 into operative engagement with pulley wheel 100, then upwardly along the sidewall 47 into operative engagement with the pulley wheel 99, then transversely into engagement with the pulley wheel 98, and thence downwardly into engagement with the underside of the pulley wheel 103, and then into connection (not shown) with the tractorward side 93 of the pad support 88. The pulley wheel 100 serves as an idler to suitably tension cable 97 as the conveyor housing is moved upwardly and downwardly, in the manner heretofore described, by the elevator housing lift mechanism 21.

Extensible and retractable support means mounted on each side of housing 28 and generally designated by the numeral 104 in FIG. 1 are provided for the cushioned or padded shelves 74 and 75. As illustrated, the padded shelves 74 and 75 are angularly disposed with respect to the ground and extend longitudinally of the harvester 210 parallel to each other. The shelf 74, when in harvesting position, is disposed tractorward of the shelf 75 with the upper edge portion 105 of the shelf 75 overlapping the lower edge portion 111 of the shelf 74, the lower or treeward edge portion 106 of the shelf 75 and the lower edge portion 111 overlapping the tractorward side 93 of the pad 69, and the upper edge portion 107 of the shelf 74 being disposed adjacent the screen 43, whereby fruit blown from a tree will be directed by the screen 43 and the pads 74 and 75 onto the catching portion 108 of the pad 69, as illustrated in FIG. 1. Each of the cushioned or padded upper surface portions of the shelves 74 and 75 comprises a smooth central portion 109 disposed medially of the opposite ends of said shelves 74 and 75. From the opposite side of each portion 109 there extends a plurality of rearwardly (when in harvesting position) and upwardly sloping elongated adjacent cushioning segments 110 having convex outer surfaces by reason of which fruit directed against said shelves is conducted by said segments 110 to their medial portions 109 and from there to the lower edge portions 106 and 111 and onto the pad catching surface 108.

Each extensible and retractable support means 104 for the shelves 74 comprises a trolley 112 having a treeward extension 100 which is pivotally secured as at 113 to a base extension 114 of said shelf 74. A pair of wheels 115 of said trolley are engaged in vertically spaced alinement in a vertical track 116 rigidly connected to the housing 28 adjacent associated of sidewalls 47 and 48. The work end of a trolley cable 117 is rigidly secured to each trolley 112. The feeding of each cable 117 is controlled by a winch 118 operably mounted on a rotatable shaft 119 which may be controlled by an hydraulic motor 120 mounted adjacent the elevator housing 28, as illustrated in FIG. 1. Thereby, upon appropriate actuation of the motor 120, the winch will wind the cable 117 to draw the trolley 112 upwardly or permit lowering thereof.

By means of rigid tie means 121, each comprising a web portion 121a and a rod portion 121b preferably of metal fabrication, one end of each of which is rigidly secured to the base 122 of the shelf 75 and the other end of each of which is projected through the cushioned or padded upper surface of the shelf 74 for rigid securance to its base 123, the shelves 74 and 75 are rigidly connected together. In the instant embodiment, two tie means 121 are employed; however, more may be used, depending upon the physical characteristics of the shelves 74 and 75 including their weights. Each of the tie means 121 is pivotally secured, as at 124, to the treeward end of an elongated arm 125, the tractorward end portion 126 of which is pivotally secured adjacent the lower end portion of a respective of the sides 47 and 48 of the elevator housing 28.

Accordingly, as the trolley 112 is moved upwardly, the shelves 74 and 75 will be carried upwardly therewith, and through the tie means 121 the upward trolley pull will be transmitted to arm 125 to cause it to rock upwardly and inwardly about pivot 124 from the position illustrated in FIGS. 1 and 5 to the position of FIG. 6. Thereupon the lower edges 111 and 106 of shelves 74 and 75 will rock inwardly toward the tractor 210 from the position of FIG. 5 to the position of FIG. 6 by reason of the linkage heretofore described and the balance of said shelves which can be controlled according to suitable conventional mechanical expedients. Lowering of the trolley 112 from the position of FIG. 6 to the position of FIG. 5 will cause the shelves to be lowered with a consequent outward rocking of the shelves to the position of FIG. 6 by reason of the aforesaid linkage and the balance which can be controlled as aforesaid.

The device is extended and folded in a manner that elevation of the elevator housing 28 and of the trolley 112 will occur substantially simultaneously with retraction of the cylinder 80 toward the support 49, with consequent inward folding of the shelves 74 and 75 and collapse of the pad support 88, to the end that the vehicle becomes portable. It is further observed that the tree side 72 of the pad 69 is fastened or connected to the outer end portion 127 of the support arm section 90 by suitable means (not shown), to the end that upon extension of the pad support 88 the pad will be extended from its retracted position heretofore described.

Attention is now invited to FIGS. 2—4 and 17—20, inclusive, in which the details of construction of a preferred form of the pad 69 are shown. By referring initially to FIG. 2, it is seen that the pad 69 is substantially rectangular in shape in which the treeward side 72 is substantially parallel to the tractor side 93, and that the opposite ends 70 and 71 are substantially parallel to each other. Extending toward the tractor from the side 93 of the pad, however, there is a node 130 disposed substantially midway between ends 70 and 71 and providing a port or entryway into the pad 69 for a plurality of air input and exhaust conduits to be presently described. Referring again to the pad 69, it is observed that it has a base 131 fabricated from a flexible material which is formed of two layers, namely, a preferably tough ground-engaging layer 132, which may be of rubberized canvas fabrication, and a tube cover layer 133. A bumper 134 comprising an air-impervious sack defining a chamber 136 sealed, except as noted to the contrary, and preferably fabricated from an elastomer, has an upwardly extending shoulder 135. The bumper 134 defines the side 72 and ends 70 and 71 of said pad 69, the shoulder extending upwardly of the base and acting as a retainer for fruit which drops on the surface 108.

A plurality of tubes A which are disposed between layers 132 and 133 are communicatively connected to a common conduit A' which enters base 131 through node 130. Conduit A' serves as a connecter for tubes A to a source of forced or pressure air. All of tubes A are communicatively connected to chamber 136, whereby chamber 136 is connected to conduit A' and whereby limited intentional access to the chamber 136 is obtained.

As illustrated in FIG. 2, the tubes A may extend from node 130 in a fanlike pattern. However, it is not intended that this invention be limited to the precise disposition of the tubes A or other tubes which will be presently defined, as various arrangements will be suitable for the purpose intended. With respect to the tubes A, they are intended to provide a permanently inflated base while the pad 69 is extended in operative, that is, fruit catching, position while the bumper 134 is adapted to provide when extended in fruit catching position a permanent inflated resilient retainer for the pad 69. Disposed between selected of the tubes A are a plurality of pairs of tubes B, C and D which extend longitudinally between respective adjacent tubes A. Half of the tubes B, C and D, in the embodiment illustrated, extend toward one end 71 from node 130, and the other half of the tubes B, C and D extend toward the other end 70 from node 130 in a manner illustrated in FIG. 2. The tubes B, C and D may be considered as extensions of air inlet and exhaust conduits B', C' and D'.

There are plural sets of conduits B', C' and D', whereas there is only a single conduit A' because of a variation in function which will presently become apparent. The conduits A', B', C' and D' extend outwardly from the node 130, as illustrated in FIG. 2, for connection with an air flow or undulation control valve generally designated by numeral 137 and illustrated in FIGS. 7—16, inclusively.

The pad 69 is characterized by an upper layer which defines fruit catching surface 108 and comprises a plurality of alternately air inflatable and deflatable segments identified as BS, CS and DS which overlay the tubes A, B, C and D. Segments BS, CS and DS are air sealed except to the extent that said segments are communicatively connected to tubes B, C and D, respectively, at the positions where said segments BS, CS and DS cross their respective tubes B, C and D. As illustrated in FIG. 2, the inflatable segments BS, CS and DS, for the most part are elliptical and concentrically arranged over the entire area bounded by the bumper 134 with the exception of that portion of pad 69 falling within the innermost segment 162 which is of smallest radius. Within the curve of the segment 162 are a plurality of BS, CS and DS segments which extend transversely of the longitudinal axis of the curvature of said segment 162. It is appreciated that by controlling the sequence of inflation and deflation of segments BS, CS and DS, successive waves or undulations can be produced in surface 108. C By referring to FIG. 2, it is seen that the means for communication between the undulatable segments BS, CS and DS and their corresponding tubes B, C and D comprise a plurality of ports 163 shown in dotted lines in FIG. 2 and only some of which have been numbered. One of such ports is clearly seen in FIG. 4, and another is seen in FIGS. 17—20. Said ports 163 are always open, and, accordingly, are immediately responsive to changes in the undulation control valve 137. Said ports 163 may be formed by securing the apertured fabric of layer 133 to the rim formed about the corresponding tube opening to provide a common port at each connection.

The valve 137 comprises air inlet housing 138 defining an air chamber and an exhaust housing 139 defining a vacuum chamber. Communicatively connected with the chamber within the air inlet housing 138 is one end of an air inlet duct 140 the opposite end of which may communicatively connect with a valve of any conventional design adapted to deliver a portion of the air under pressure generated in the fan 32 to the duct 140 and thence to the housing 138. One end of an exhaust duct 141 is communicatively connected with the vacuum chamber within the housing 139, the other end thereof being communicatively connected to an exhaust pump which may be driven by the prime mover for the tractor 210 in any conventional fashion.

The inner end of the housing 138 is defined by an apertured valve plate 147 which sequentially uncovers apertures 148, 149 and 150 spaced about points disposed as apices of an equilateral triangle in a stationary plate 158 to be hereinafter described. A rotor 143 the outer wall of which defines the chamber 138 comprises the valve plate 147 which is disposed against the plate 158 and securely mounted on a rotatable shaft 151. The plate 147 has an arcuate or kidney shaped slot 144 adapted as it rotates to cover and uncover apertures 148, 149 and 150, as illustrated in FIGS. 10, 12, 14 and 16. It is observed that the slot 144 is of an arcuate length sufficient to always have uncovered at least one and at times two of the openings 148, 149 and 150 simultaneously.

The exhaust housing 139 is defined by a rotary apertured valve plate 152 which sequentially uncovers a plurality of apertures 153, 154 and 155 in a stationary plate 159 to be hereafter further described, said apertures 153, 154 and 155 being in alinement with the apertures 148, 149 and 150, respectively, axially of shaft 151. The housing 139 comprises a rotor 146 defining the outer wall of said housing. Rotor 146 is integral with the aforesaid valve plate 152 and slidable against the plate 159. The valve plate 152 is secured on the shaft 151 and has an arcuate or kidney shaped slot 164 adapted to uncover the apertures 153, 154 and 155, as illustrated in FIGS. 9, 11, 13 and 15.

From the foregoing, it is seen that both of the valve plates 152 and 147 are rotated together as a consequence of the drive through belt 142 engaging in pulley groove 145 formed peripherally in plate 147. Said belt may be powered by any suitable means such as motor 172. In the embodiment of the invention disclosed, the rotors 143 and 146 rotate in the direction indicated by the arrows in FIGS. 9—16, inclusively.

Figure 7:
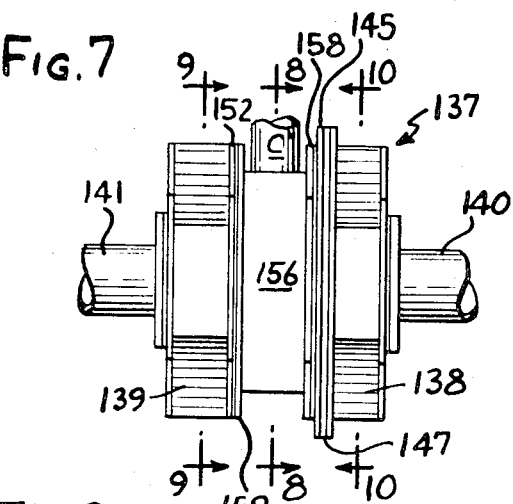
FIG. 7 is an elevational view of a valved air and vacuum flow control construction adapted to impart undulating motion to the fruit catcher or pad.
Figure 8:
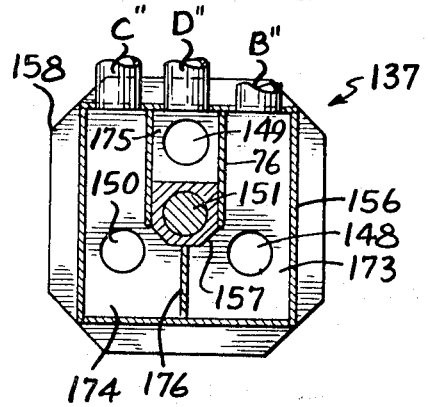
FIG. 8 is a sectional view taken substantially on the line 8–8 of FIG. 7 and looking in the direction of the arrows.

Disposed between the housings 138 and 139 is a medial housing section 156. Sealing means, if necessary, may be used between housings 138, 139 and 156 and between said housings and ducts 140 and 141. The shaft 151 is journaled in a bearing member 157 suitably mounted within said housing section 156. On opposite sides the housing section 156 is bounded by a pair of parallel aforesaid plates 158 and 159, as illustrated in FIG. 7. It is appreciated, of course, that the plate 158 is disposed slidably against the plate 147, and that the plate 159 is similarly disposed against the plate 152.

The medial housing section 156 is divided into sealed chambers 173, 174 and 175, by means of suitable interior partitions 176. Access to the chambers 173, 174 and 175 is through the valve ends C'', D'' and B'' of the pairs of conduits C', D' and B', respectively, and through the apertures in the housing plates 158 and 159 which are in alinement with the apertures 148, 149 and 150 and the apertures 153, 154 and 155, respectively. That is to say, access to chamber 173 is through the conduit and B″ and through the medial housing apertures alined with aperture 148 and aperture 153; access to the chamber 174 is through the conduit end C″ and through the apertures in the medial housing section 156 alined with aperture 150 and aperture 155; and access to the chamber 175 is through the conduit and D″ and through the apertures in the medial housing 156 alined with apertures 149 and 154.

It is appreciated that each pair of the conduits B′, C′ and D′ is communicatively connected to a respective conduit end B″, C″ and D″ and thereby has a controlled air pressure source and a controlled exhaust source operated by the rotors 143 and 146, whereby air may be pushed through and exhausted from the conduits B′, C′ and D′, and, accordingly, the segments BS, CS and DS. As regards the conduit A′, it may be supplied with air pressure directly from the fan or in any other suitable manner, as the air therein will not normally be cycled when harvesting a tree and is kept under relatively constant pressure, whereby the base 131, as well as the bumper 134, is continuously inflated by reason of the inflation of tubes A.

Figure 9:
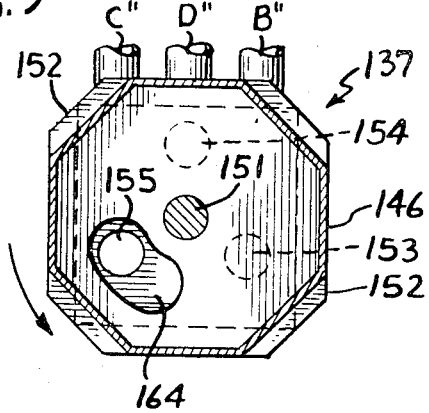
FIG. 9 is a sectional view taken substantially on the line 9–9 of FIG. 7 and looking into the vacuum chamber in the direction of the arrows.
Figure 10:
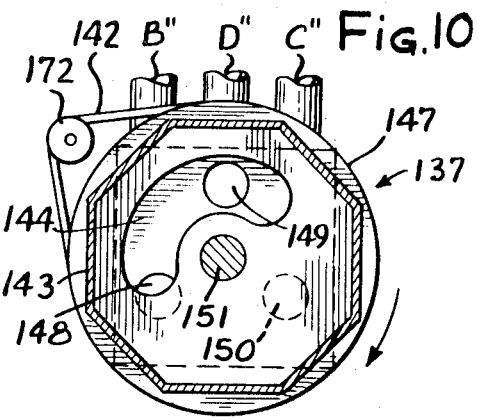
FIG. 10 is a sectional view taken substantially on the line 10–10 of FIG. 7 and looking into the air chamber in the direction of the arrows.

FIGS. 7—20, inclusive, illustrate the pad 69 undulating cycle. FIGS. 9, 10 and 17 are coresponsive, illustrating the segments DS in the process of being inflated, aperture 149 being uncovered, while the segments CS are deflated, aperture 155 being uncovered. Segments BS, which were previously inflated, are at about their maximum expansion with closure of aperture 148 about to occur.

Figure 11:
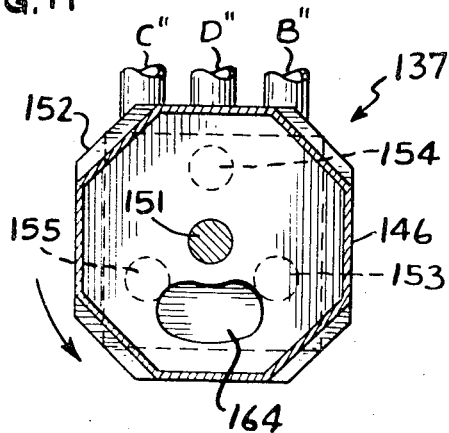
FIG. 11 is a view similar to FIG. 9, however showing the vacuum chamber valve plate in another phase.
Figure 12:
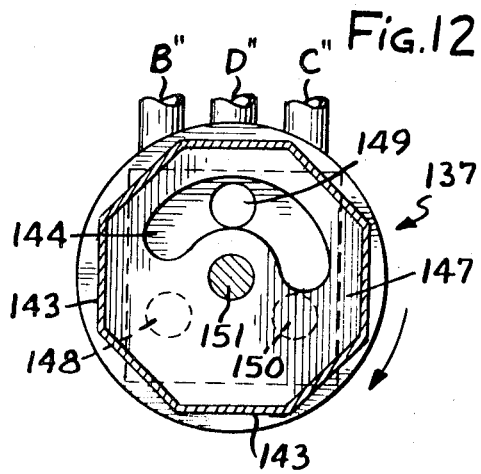
FIG. 12 is a view similar to FIG. 10, however showing the air chamber valve plate in another phase and corresponding to FIG. 11.
Figure 17:
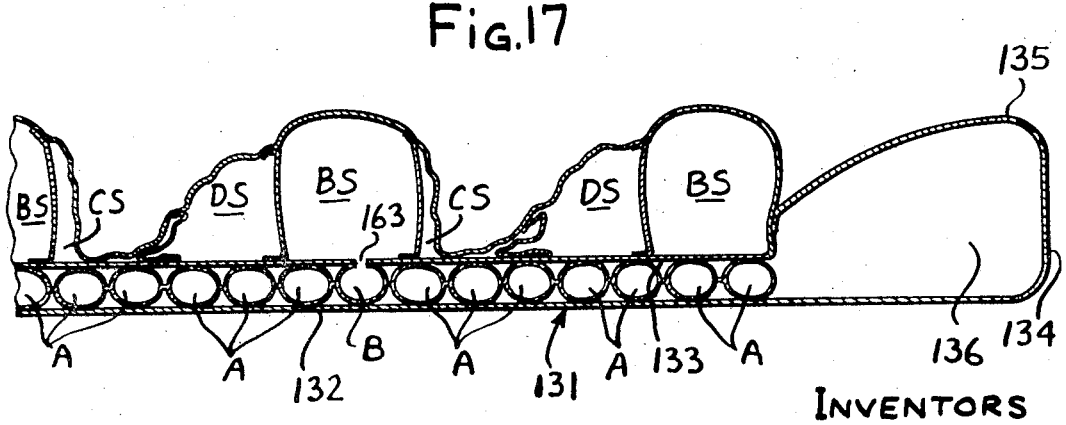
FIG. 17 is a cross-sectional view of the fruit catcher or pad corresponding to the phases of the valve plates shown in FIGS. 9 and 10 and taken substantially on the line 17–17 of FIG. 2.
Figure 18:
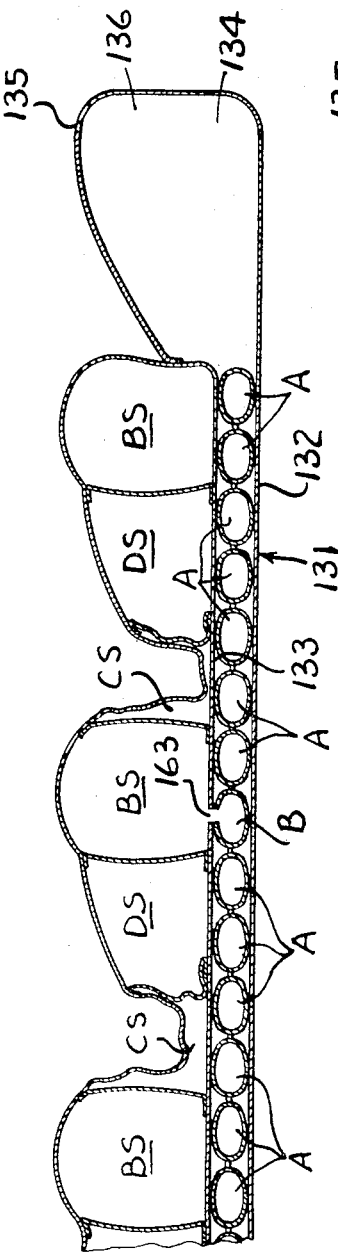
FIG. 18 is a view similar to FIG. 17, however showing the fruit catcher or pad in the phase corresponding to the positions of the valve plates shown in FIGS. 11 and 12.

FIGS. 11, 12 and 18 are coresponsive. The slot 144 continues to uncover the aperture 149, and the segments DS have inflated further from the position of FIG. 17. Though no vacuum is being drawn against the pad 69, the segments CS previously deflated continue in such state as they have received no air since deflation. Segments BS continue the state of FIG. 17 as aperture 153 has not yet been uncovered.

Figure 13:
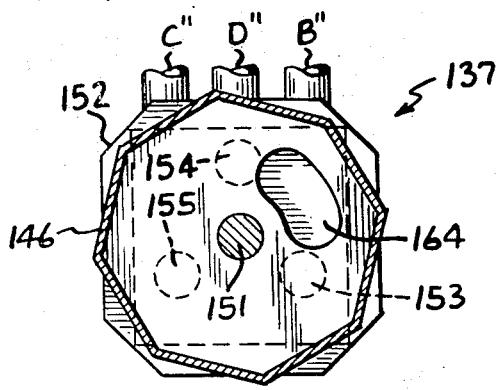
FIG. 13 is a view similar to FIG. 9, however showing the vacuum chamber valve plate in yet another phase.
Figure 14:
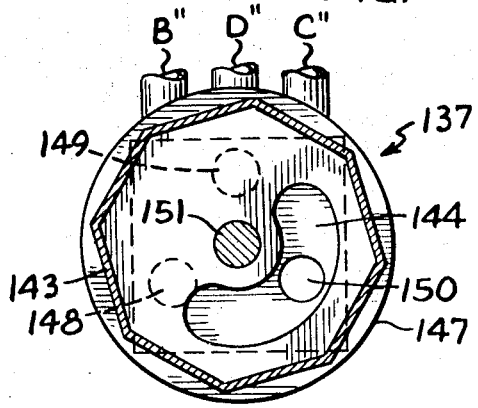
FIG. 14 is a view similar to FIG. 10, however showing the air chamber valve plate in yet another phase and corresponding to FIG. 13.
Figure 19:
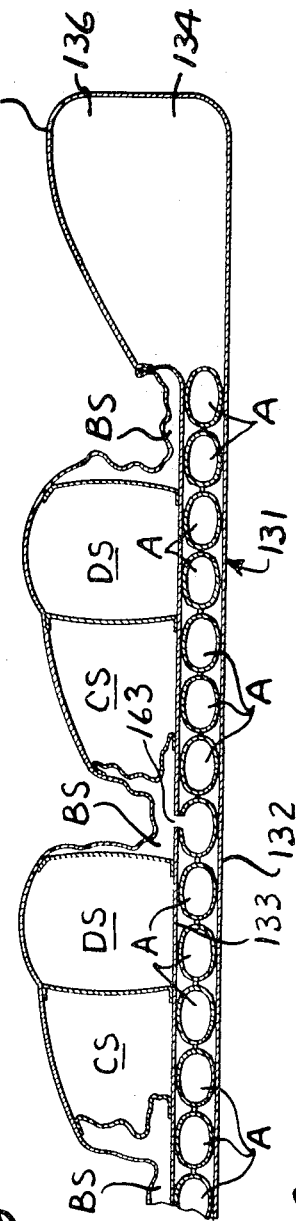
FIG. 19 is a view similar to FIG. 17, however showing the fruit catcher or pad in a phase corresponding to the valve plates in the positions shown in FIGS. 13 and 14.

FIGS. 13, 14 and 19 are coresponsive, and they illustrate the valve plate 147 disposed with its slot 144 uncovering the aperture 150 whereby air pressure is inflating the segments CS. In the position illustrated in FIG. 19, however, the segments BS have been deflated as a result of the passage of the slot 164 over the aperture 153 between the position shown in FIG. 11 and that shown in FIG. 13.

Figure 15:
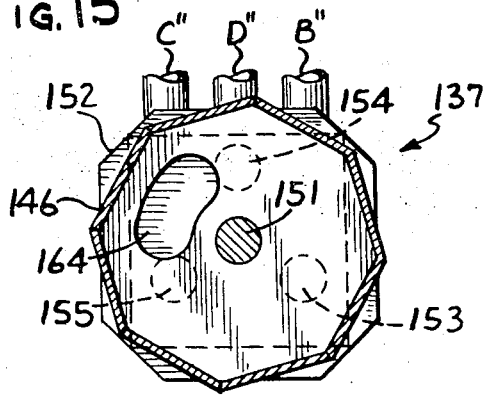
FIG. 15 is a view similar to FIG. 9 and showing still another phase of the vacuum chamber valve plate.
Figure 16:
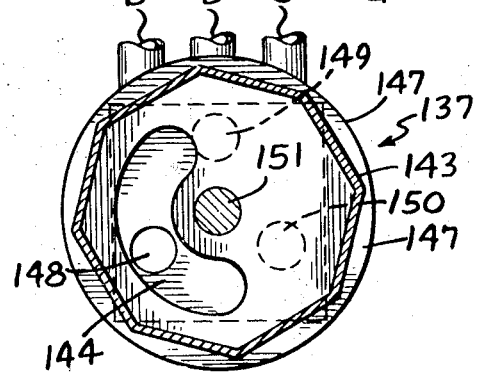
FIG. 16 is a view similar to FIG. 10, however showing still another phase of the air chamber valve plate and corresponding to FIG. 15.
Figure 20:
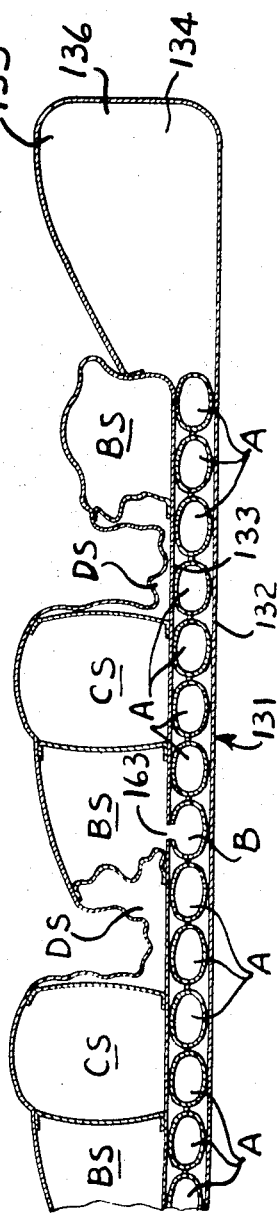
FIG. 20 is a view similar to FIG. 17, but showing the fruit catcher or pad in a phase corresponding to the positions of the valve plates shown in FIGS. 15 and 16.

FIGS. 15, 16 and 20 are coresponsive, and by referring to FIG. 20 it is noted that the segments DS are now deflated as a consequence of the rotation of the slot 164 past the opening 154 as it moved from the position of FIG. 13 to the position of FIG. 15 to thereby exhaust said segments DS. On the other and, the segments BS have begun to fill by reason of the disposition of the slot 144 over or in register with the opening 148 to allow the air pressure into the conduits B′.

By reason of the foregoing, an undulating motion is set up in the pad 69. Such motion moves fruit which is dropped on surface 108 toward the node 130 which is disposed beneath or adjacent and in delivery relation with the elevator in the housing 28. Fruit, accordingly, will be elevated in a conventional manner through the housing 28 and delivered to the conveyors 27 for delivery to containers 25 and 26.

It is appreciated that the parts of the pad 69 are all preferably of some elastomer fabrication to minimize bruising. Furthermore, it is preferable that the fabric of the inflatable parts have elastic characteristics which further tend to minimize bruising. Additionally, it is observed that the number and the disposition of the undulating segments BS, CS and DS, as well as the diameter of such segments, is such that they are employed to control the direction of the fruit flow on surface 108. As other arrangements of undulating segments within the scope of the invention will be found suitable for catching and conveying fruit to the elevator housing 28, the illustrated embodiment is not intended as limiting.

As many substitutions or changes could be made in the above described construction, and as many apparently widely different embodiments of the invention within the scope of the claims could be constructed without departing from the scope and spirit thereof, it is intended that all matter contained in the accompanying specification shall be interpreted as being illustrative and not in a limiting sense.

We claim:

1. A static conveyor means defining a material supporting apron and characterized by a plurality of successively inflatable members defining a material receiving and conveying surface; air supply means providing a source of air under pressure; air exhaust means, and cycling means for alternately connecting said inflatable members to said air supply means and said exhaust means to undulate said receiving surface and convey material thereon to a discharge area.

2. An undulating conveyor defining a material supporting apron and characterized by a plurality of air inflatable and deflatable members disposed on the top of said apron and defining an upper material receiving and conveying surface; means comprising air supply and exhaust tubes connected to respective members; air supply means for providing air under pressure to respective members through said tubes; exhaust means for evacuating air from respective members through said tubes, and valve means for cyclically providing air under pressure and exhausting respective members to undulate said surface and thereby convey the material thereon to a discharge area.

3. A static conveyor construction adapted to catch and convey articles disposed thereon and comprising a plurality of tubes serving as ducts for passage of air and connectable to a source of supply for air under pressure; a plurality of cyclically inflatable and deflatable members connected to some of said tubes and defining a surface adapted to catch and convey such articles; means connected to said members for inflating and deflating same to undulate said surface for conveying the articles to a fruit receiving station, the remainder of said tubes providing, when air filled, a continuously inflated base for said inflatable and deflatable members.

4. A static conveyor construction adapted to carry articles thereon to a receiving station and comprising a plurality of tubes comprising ducts for passage of air and connected to a source of supply for air under pressure; a plurality of cyclically inflatable and deflatable members disposed above said tubes and defining an undulating surface adapted to catch and convey said articles to a receiving station, said inflatable and deflatable members connected to some of said tubes, means connected to said members for inflating and deflating same to undulate said surface for conveying the articles, and an inflated retainer partially perimetrically disposed with respect to said inflatable and deflatable members, the remainder of said tubes providing a continuously inflated base for said inflatable and deflatable members and connected to said retainer.

5. A static conveyor construction adapted to catch and convey articles disposed thereon to a receiving station and comprising a base defining vertically spaced upper and lower layers; a plurality of tubes comprising ducts for passage of air and disposed in said base between said layers; a plurality of inflatable and deflatable members mounted on said upper layer and communicatively connected therethrough to some of said tubes respectively, said inflatable and deflatable members defining an undulating surface adapted to catch and convey thereon such articles to a receiving station, means connected to said members for inflating and deflating same to undulate said surface for conveying the articles, and an inflated retainer disposed partially perimetrically of said undulating surface and defining a material catching and conveying area on said undulating surface, the remainder of said tubes providing a continuously inflated base and connected to said retainer for continuous inflation thereof.

6. The static conveyor defined in claim 5 in which the retainer has opposite end portions disposed longitudinally thereof in spaced apart relationship defining therebetween on said undulating surface a gate toward which the articles are conveyed by said undulating surface.

7. A static conveyor adapted to catch and convey articles thereon and comprising a base defining in vertically spaced relationship a lower base layer and an upper layer; a plurality of inflatable and deflatable arcuate members mounted on the top of the upper layer in concentric relationship and defining an undulating surface adapted to catch and convey articles deposited thereon; a continuously inflated retainer disposed about a portion of said undulating surface and having opposite spaced apart ends defining therebetween a gate toward which said undulating surface is adapted to convey such articles; a plurality of first and second tubes defining ducts for passage of air and disposed between said lower and upper layers, said inflatable and deflatable arcuate members, said upper layer and said first tubes having alined ports communicatively connecting said inflatable and deflatable arcuate members with said first tubes, means associated with said first tubes for successively pressurizing and exhausting same to undulate the undulatable surface, said second tubes continuously carrying air and connected to said retainer to provide a continuously inflated base and retainer.

8. The static conveyor defined in claim 7 further characterized in that successive of said first tubes are communicatively connected to successive of said inflatable and deflatable arcuate members, respectively.

9. The static conveyor defined in claim 8 further characterized in that each of said first tubes is connected to a plurality of said inflatable and deflatable arcuate members.